Figure 4:
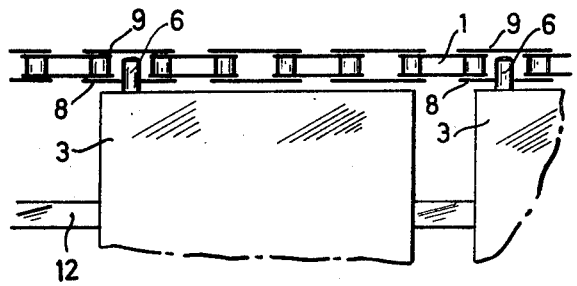

Nov. 5, 1957　　　　　O. F. PRASZ　　　　　2,811,933
ARRANGEMENT IN CONVEYORS FOR MOULDING PLANTS FOR
Filed Nov. 21, 1955　CHOCOLATE AND SIMILAR MOULDABLE MASSES
　　　　　　　　　　　　　　　　　2 Sheets-Sheet 1
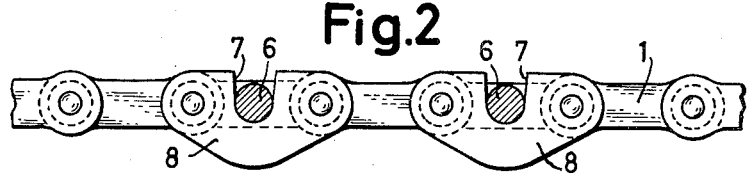
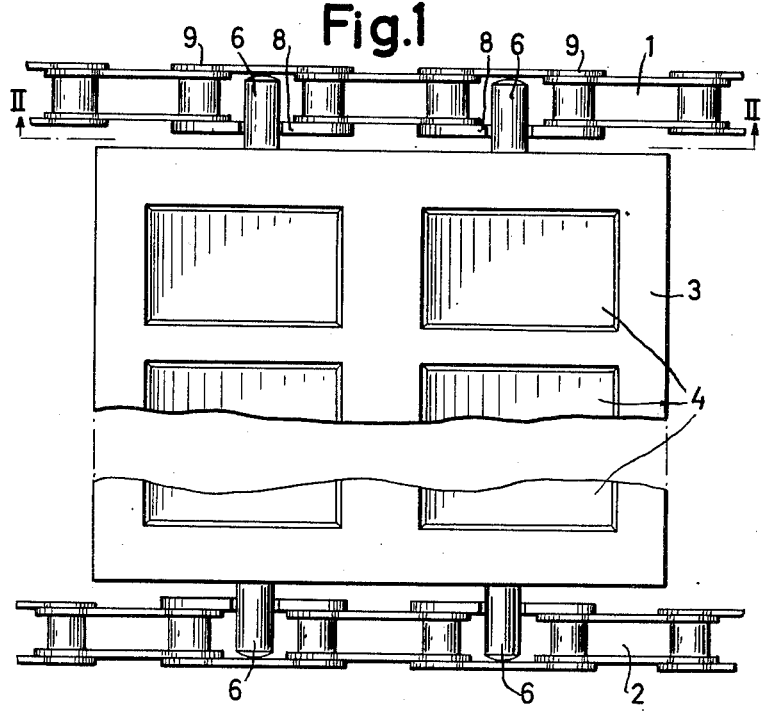
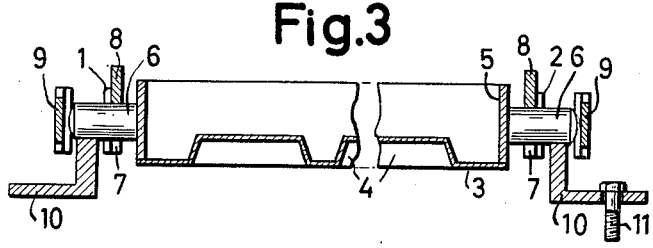
INVENTOR
OVE FRANZ PRASZ Nov. 5, 1957  O. F. PRASZ  2,811,933
ARRANGEMENT IN CONVEYORS FOR MOULDING PLANTS FOR
CHOCOLATE AND SIMILAR MOULDABLE MASSES
Filed Nov. 21, 1955  2 Sheets-Sheet 2

OVE FRANZ PRASZ
INVENTOR

BY Wenderoth, Lind & Ponack
ATTORNEYS

United States Patent Office 2,811,933
Patented Nov. 5, 1957

2,811,933

ARRANGEMENT IN CONVEYORS FOR MOULDING PLANTS FOR CHOCOLATE AND SIMILAR MOULDABLE MASSES

Ove Franz Prasz, Gentofte, Denmark, assignor to Mikrovaerk A/S, Soberg, near Copenhagen, Denmark Application November 21, 1955, Serial No. 547,978

Claims priority, application Denmark November 25, 1954

3 Claims. (Cl. 107—8)

In chocolate moulding plants, the mass is poured into a number of successive moulds or mould plates which after having been filled with the moulding mass are carried through a shaking station for ensuring that the mass penetrates into all parts of the mould cavity. From the shaking station the moulds pass into a cooling chamber for cooling the moulded mass, and in this cooling chamber the moulds are turned so as to leave the chamber with their undersides facing upwards. The cooled chocolate articles are then knocked out of the moulds, whereupon the latter are heated and once more turned with their undersides downwards so as to be ready for the next pouring operation.

In plants of the above mentioned type the moulds or mould plates are usually carried and advanced by two endless parallel roller chains to which the mould plates are secured by means of special mould carriers or mould frames which are secured permanently to the chains. The said mould carriers are usually provided with guides into which the mould plates can be slid and be temporarily secured by means of a lock. In other words, the mould carriers offer a comparatively easy and quick replacement of the mould plates, which feature really is the main purpose of the mould carriers. The mould carriers may be permanently connected to the chains by transverse rods which are secured in both chains and carry the mould carriers in such a way that the latter can be tilted or turned. Another possibility consists in connecting the mould carriers to the chains by means of pins which are fixed in the front edge of each mould carrier and are in permanent engagement with the chains.

The mould carriers cause an increase in the manufacturing costs of the conveyor consisting of the said mould carriers besides the two chains and the mould plates proper, and the mould carriers also cause a certain loss during the operation of the moulding plants, because the mould carriers must necessarily be subjected to the shaking action together with the mould plates and must be cooled and heated together with them. These drawbacks involved by the use of the mould carriers have hitherto been put up with from the point of view that the mould carriers were necessary in order to make an easy and quick replacement of the mould plates possible in the case of damage or when switching to another type of mould plates in the plant. The fact is that in the hitherto known plants with the mould plates suspended direct from the chains, i. e. without any mould carriers, such a replacement has not been possible.

The present invention relates to an arrangement in conveyors of the latter type, i. e. the type in which no mould carriers are used, and the purpose of the invention is to provide a construction in which the advantage deriving from the mould carriers in the known plants as regards an easy replacement of the mould plates is nevertheless gained.

Thus, the invention relates to an arrangement in conveyors for moulding plants for chocolate and similar mouldable masses, comprising of a series of successive mould plates carried by endless parallel roller chains or similar conveyor elements by means of pins which project outwards from the mould plate or the chain links and engage corresponding openings in the chain links or the mould plate, respectively. The characteristic feature of the invention consists in that the said openings terminate in an edge of the chain links or the mould plate in order to enable a direct lifting of the mould plate from the chains to be performed, while at the points of turning of the chains, and at other points where it be deemed necessary, stationary rails are provided extending alongside the chains in such positions that they prevent the pins from disengaging the openings. In such a conveyor the replacement of the moulds can be performed in an exceedingly simple manner, as, for example on the stretch before the moulding machine, the hitherto used moulds are only lifted from the chains and the new moulds substituted. In other words, not even the release of a locking mechanism is needed as was the case in the conveyors with mould carriers or mould frames hitherto used. The mould plates must certainly in some way or other be locked to the chains along the stretches where they are moved in a reverse position, i. e. with their mould cavities facing downwards, but this locking is effected by means of said stationary rails which will not hamper the replacement of the mould plates along other stretches of their travelling path.

An embodiment of a conveyor with the arrangement according to the invention is illustrated on the drawing where Fig. 1 shows part of the conveyor in plan view.

Figure 5:
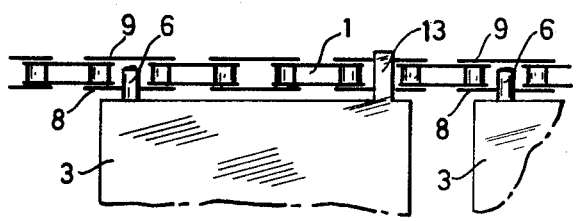
Figure 6:
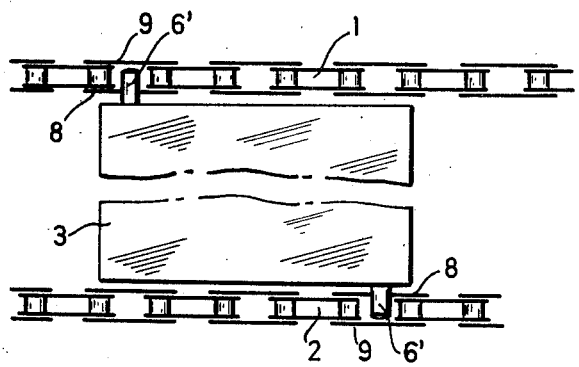
Figure 7:
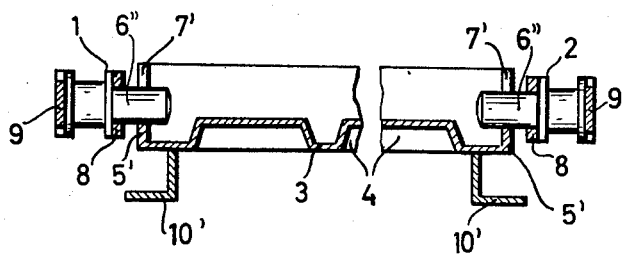

Fig. 2 a section on line II—II in Fig. 1,

Fig. 3 a section at right angles to the conveyor on a stretch along which the mould plates would tend to fall from the conveyor under the effect of gravity, Fig. 4 a diagrammatical plane view of a modification of the conveyor illustrated in Figs. 1 to 3, Fig. 5 a similar view of another modification, Fig. 6 a similar view of a third modification, and Fig. 7 a section similar to that illustrated in Fig. 3 but showing an embodiment in which the pins are secured to the chains and are received in pockets in the mould elements.

In the embodiment shown on the drawing the conveyor comprises two parallel endless chains 1 and 2 and a considerable number of mould elements 3, only a single one of which is shown on the drawing. This mould element 3 is in the usual manner provided with a number of mould cavities 4 and an edge frame or edge rib 5. To the sides of the frame 5 facing the roller chains 1 and 2, a pair of carrying pins 6 have been welded on or secured in some other way, the spacing of which pins is adapted to the pitch of the chains 1 and 2. The carrying pins 6 may conveniently be of the same diameter as the rollers in the two chains 1 and 2 and rest rotatably in upwardly open pockets 7 in linking elements 8 of the chains 1 and 2. The carrying pins 6 have such a length that they touch or almost touch the inside of the link plates 9 incorporated in the chains 1 and 2 opposite to the linking elements 8, so that a transverse displacement of the mould elements 3 is impossible.

By the term "upwardly open" pockets used above should be understood recesses having their openings facing upwards along the stretches of the path of the chains where the mould elements 3 have their upper sides facing upwards.

During part of their cyclic motion, the linking elements 8 must necessarily have the pockets 7 facing downwards as shown in Fig. 3. In order to prevent the mould elements 3 from disengaging the chains 1 and 2 along such stretches, there is at each chain provided a stationary rail 10 extending alongside the chains in such positions that they prevent the pins 6 from getting out of engagement with the pockets 7 of the linking elements 8. In Fig. 3 the mould element 3 is in other words carried by the two rails 10, while the linking elements with the pockets 7 serve only for carrying the mould element along with them in the motion of the chains.

The rails 10 may by means of screws 11 or in some other suitable way be secured to the framing of the moulding plant.

Each mould element 3 need not, as shown in Figs. 1 to 3 of the drawing, be provided with four carrying pins 6, as the two rearmost carrying pins may be omitted, as shown in Figs. 4 and 5, in which case the rear end of the mould element may be supported in any convenient manner, e. g. by one or more stationary rails 12 (Fig. 4) or by means of simple, outwardly-projecting tongues 13 (Fig. 5) resting on the upper edges of the chains 1 and 2. When the mould element 3 has only a single carrying pin 6 at either side, the carrying pin at one side may be placed at or in the vicinity of the front edge of the mould, while the pin at the other side is mounted at or in the vicinity of the rear edge of the mould element, as shown in Fig. 6, so that in other words the two pins 6' are located more or less diagonally in relation to the mould element.

Another embodiment may also be imagined, in which the carrying pins or the corresponding carrying members are fixed to the linking elements in the chains 1 and 2. In this case, each mould element 3 may in the vertical sides facing the chains be provided with downwardly open recesses intended for engagement with the carrying pins.

In the embodiment of the arrangement according to the invention shown on the drawing, the mould elements 3 in reality rest loosely on or in the conveyor chains 1 and 2. This entails a quite extraordinary advantage during the passage of the mould elements past or through a shaking mechanism or shaking station, as the latter need only give the mould elements proper a shaking motion, while hitherto it has been necessary to let not only the mould carriers, but also the chains participate in the shaking motion.

In the embodiments described above with recesses in the chain links and the moulds, respectively, the recesses have been stated to be open upwardly and downwardly, respectively. The reverse may, however, also be the case if only the holding or guiding rails 10 are mounted in a suitable way. This has been illustrated in Fig. 7 which is a view similar to Fig. 3. According to Fig. 7 the pins 6" are secured to the linking elements 8 of the chains 1 and 2, and their free ends are received in pockets 7' formed in the edge frame or edge rib 5' of the mould element 3. In the position shown in Fig. 7, the mould element 3 is shown top side down, and the element is slidably supported by stationary rails 10'. It clearly appears that these rails 10' prevent an unintentional disengagement of the pins 6" from the pockets 7' which are "downwardly open" according to the definition given in the foregoing.

I claim:

1. In a confectionery mass moulding plant, a conveyor comprising a pair of parallelly spaced endless chains, each of which comprises a series of spaced links connected to one another by a plurality of linking elements, a plurality of mould elements, spaced from one another and arranged between the pair of chains, and a plurality of pins drivingly connecting said mould elements with said linking elements and extending transversely to said chains, each of said pins having one end thereof secured to an element of one plurality of elements and each element of the other plurality of elements having a pocket into which a pin is engaged, and guide rail means extending along the portion of the path of said mould elements along which said pins would tend to disengage from said pockets under the effect of gravity, for preventing disengagement of said pins from said pockets.

2. A conveyor as claimed in claim 1 in which said pins are on said linking elements and said pockets are in said mould elements.

3. A conveyor as claimed in claim 1 in which said pins are on said mould elements and said pockets are in said linking elements.

References Cited in the file of this patent
UNITED STATES PATENTS

| | | |
|---|---|---|
| 2,240,214 | Heidelmeyer et al. | Apr. 29, 1941 |
| 2,520,073 | Tunley | Aug. 22, 1950 |
| 2,640,444 | Reget | June 2, 1953 |

FOREIGN PATENTS

| | | |
|---|---|---|
| 935,786 | France | Feb. 9, 1948 |